LOCATING OBJECTS VIEWED BY REMOTE TELEVISION CAMERA

Filed April 30, 1956

5 Sheets-Sheet 1

INVENTOR.
Arthur C. Stocker
BY J. L. Whittaker
ATTORNEY

INVENTOR.
Arthur C. Stocker
BY J. C. Whittaker
ATTORNEY

May 8, 1962 A. C. STOCKER 3,033,923

LOCATING OBJECTS VIEWED BY REMOTE TELEVISION CAMERA

Filed April 30, 1956 5 Sheets-Sheet 3

INVENTOR.
Arthur C. Stocker
BY
J. L. Whittaker
ATTORNEY

INVENTOR.
Arthur C. Stocker
BY J. L. Whittaker
ATTORNEY

INVENTOR.
Arthur C. Stocker
BY J. L. Whittaker
ATTORNEY 3,033,923
LOCATING OBJECTS VIEWED BY REMOTE TELEVISION CAMERA Arthur C. Stocker, Collingswood, N.J., assignor to Radio Corporation of America, a corporation of Delaware Filed Apr. 30, 1956, Ser. No. 582,617
4 Claims. (Cl. 178—6.8)

This invention relates to television and to means for determining at a remote location the positions of objects in the television picture relative to the television camera.

The invention is applicable to military uses and to numerous industrial or commercial uses. However, in the preliminary explanation which follows, a specific military use has been chosen to demonstrate the manner in which the invention operates. Industrial and commercial uses of the invention are shown in a number of the figures and explained in detail later.

It has been proposed that a television camera be installed in a remotely controlled aircraft and the combination used for reconnaissance flights behind the enemy's front lines. An advantage of such an arrangement is that a human pilot is not exposed to the danger of enemy gunfire. It has also been suggested that this aircraft transmit information as to the location of enemy targets seen by the television camera so that the targets may be subjected to gunfire. The location of the target must be made in two steps. First, the aircraft must be located with respect to the surrounding terrain. This may be done by means of radar or other navigational aids. Second, the target must be located with respect to the aircraft. This invention relates to improvements in the means for locating the target's position with respect to the aircraft.

The location of the target with respect to the aircraft has two dimensions; the azimuth angle, and the angle of depression. The first of these may be found by referring the axis of the camera to the compass. This forms no part of this invention. The latter is more difficult. A pendulum is practically useless, for the sidewise motion of the aircraft causes it to swing. There are gyroscopes in the autopilot, but their axis is not necessarily vertical, and when it is not, there is the problem of converting from one set of axes to another. Even if the gyroscope's axis is vertical, there remain the problems of bringing out a signal for which the autopilot is not designed, and of preparing that signal for transmission to the ground station. Moreover, determining a depression angle in this way would be complicated and expensive.

It is an object of this invention to provide a simple and relatively inexpensive means for determining the angle of depession of an object with respect to a television camera located above the object.

It is a more general object of this invention to provide an improved arrangement for determining the angle between two objects viewed on the screen of a television receiver with respect to the television camera viewing the objects.

This invention makes use of the television circuit itself as an instrument for measuring the angle between two objects seen by a television camera. The horizontal and/or vertical synchronization pulses are delayed amounts sufficient to permit them to appear on the screen of a television receiver, when intensified. Means are provided for intensifying these marks at times such that they appear aligned with the two objects of interest. The time delay between the marks is a measure of the angle between the two objects with respect to the television camera.

In the specific military application discussed in brief above, advantage is taken of the fact that over a large portion of the world the ground is relatively flat. This permits one to use the horizon as a reference point when measuring the angle of depression of a ground target.

In this form of the invention, the television receiver at the ground location includes receiver circuits for receiving horizontal and vertical synchronization signals and picture signals, and display means for displaying the picture. The horizontal synchronization signals are delayed an amount sufficient to permit them to appear on the display means. The vertical synchronization signals are delayed adjustable amounts. Means are coupled to the horizontal signal delay means and the vertical signal delay means for placing a mark on the screen aligned with the horizon and a second mark on the screen aligned with the target. The vertical space between the two marks is indicative of the angle of depression between the horizon and the target, as viewed from the aircraft.

Where the depression angle is relatively large, optical means are employed for making a fixed reduction in the measured angle.

Although in the foregoing discussion, the invention is related to the measurement of an angle of depression below the horizon, it will be appreciated that the invention has much broader applicability. In industrial or commercial applications, for example, the invention is useful wherever it is desired to measure the angle between two objects with respect to a viewing point, that is, with respect to a remotely located television camera.

The invention will be described in greater detail by reference to the following description taken in connection with the accompanying drawing in which.

Throughout the figures, similar reference numerals are applied to similar elements.

Figures 1, 2:
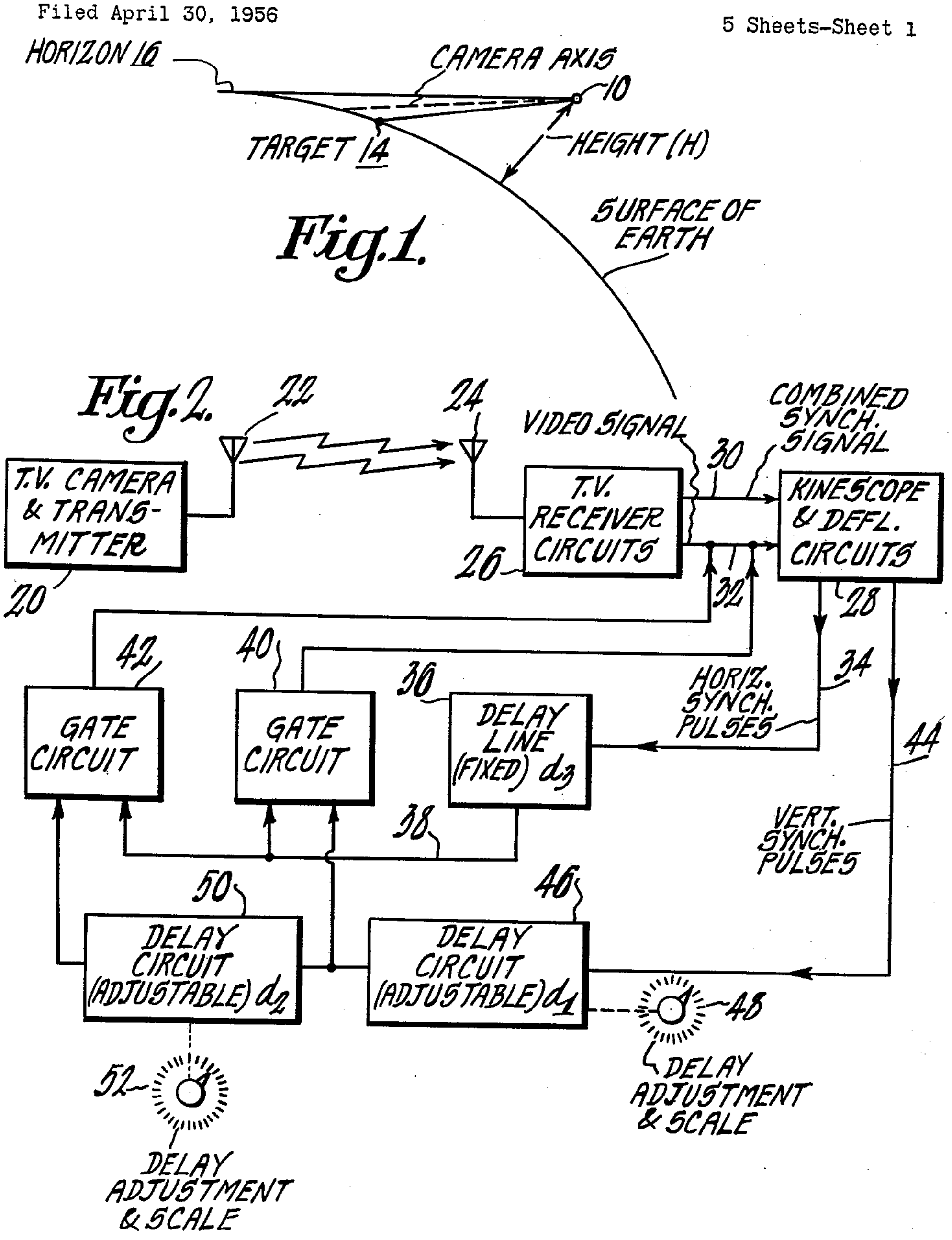
FIGURE 1 is a sketch showing a military application of this invention.
FIGURE 2 is a block circuit diagram of one form of the invention.

Referring to FIGURE 1, a drone aircraft 10 flying behind the enemy line carries a TV camera. The aircraft is flying at a height H. The angle of depression of a target 14 is measured with respect to the horizon 16.

The entire television system is shown in block circuit diagram form in FIGURE 2. The television camera and transmitter are conventional and are illustrated by a single block 20. They pick up the television picture and transmit picture and synchronization signals by means of antenna 22. The camera and transmitter are, of course, located in the aircraft. The aircraft itself is remotely controlled and its position relative to the terrain may be determined by means of radar or other navigational aids. These form no part of this invention and are not illustrated.

The transmitted picture and synchronization information is received at the ground location by the antenna 24 of the television receiver circuits 26. These, as well as the kinescope and deflecting circuits 28 are conventional and are therefore illustrated by blocks. One lead 30 is shown for carrying the combined synchronization signal from the receiver to the deflecting circuits and another lead 32 is shown for carrying the video (picture) signal from the receiver circuits to the kinescope.

Figure 3:
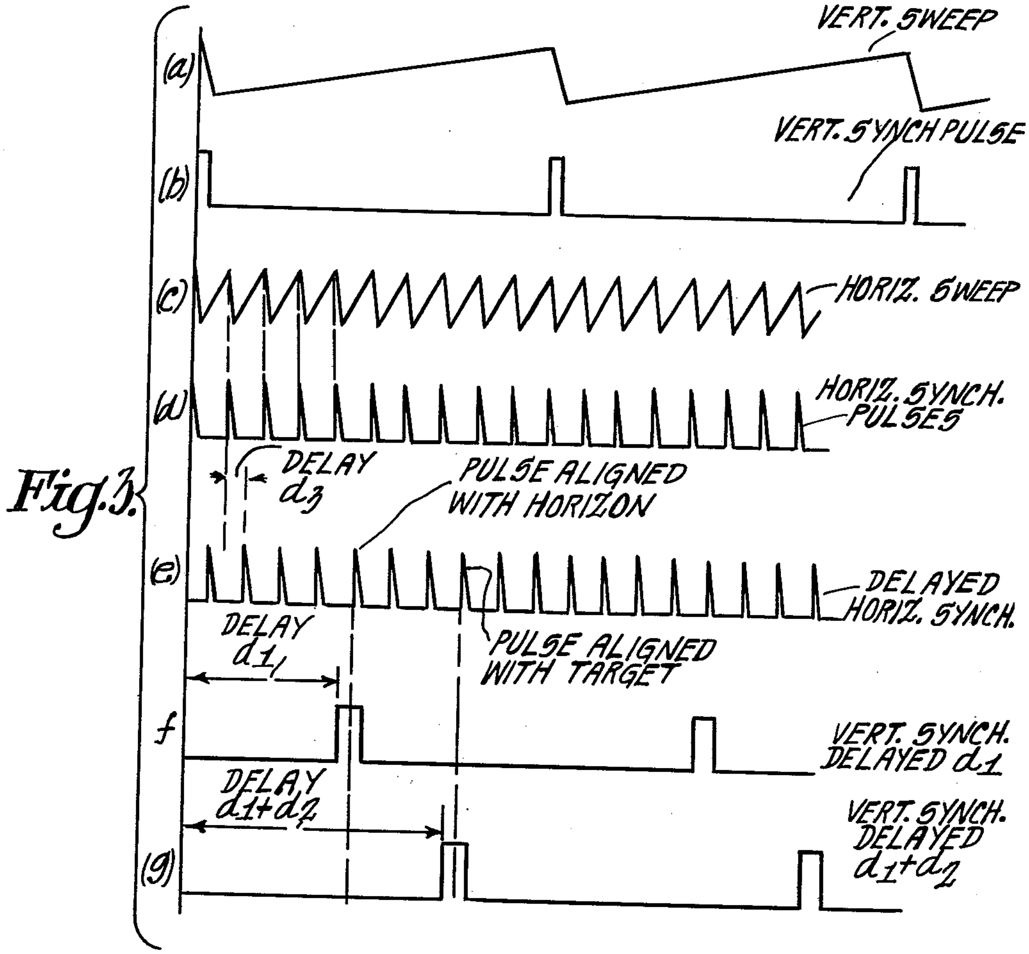
FIGURE 3 is a drawing of waveforms present in various portions of the circuit of FIGURE 2.

In the discussion which follows concerning the remainder of the system shown in FIGURE 2, the reader should refer also to FIGURE 3 which illustrates various waveforms. The vertical and horizontal sweeps are shown at *a* and *c*, respectively. The vertical synchronization pulses *b* are synchronous with the vertical sweeps and the horizontal synchronization pulses *d* are synchronous with the horizontal sweeps. In normal television receiving systems, neither the horizontal nor vertical synchronization pulses appear on the cathode ray tube indicator screen. The former occur after the last line of a frame and before the beginning of the first line of the next frame; the latter occur after each horizontal sweep and before the beginning of the next horizontal sweep.

Referring again to FIGURE 2, the horizontal synchronization pulses are applied via lead 34 to a delay line 36. The latter delays the horizontal synchronization pulses an amount sufficient so that they occur shortly after the beginning of each horizontal sweep. In other words, if all of these pulses were displayed, they would form a vertical line along the left edge of the screen. The delayed pulses are applied over lead 38 to gate circuits 40 and 42. The latter may, for example, comprise tetrodes which require the coincidence of two pulses to pass a signal. The delayed pulses are applied to one of the grids of the tetrodes.

The vertical synchronization pulses are applied over lead 44 to delay circuit 46. The latter, for example, may be a phantastron such as described at page 287 of volume 19 of the Radiation Laboratory Series. Other equally well known delay circuits may be used instead. The delay introduced by circuit 46 is adjustable and may be controlled by a control knob 48. The output pulse of delay circuit 46 is applied both to gate circuit 40 and to the adjustable delay circuit 50. The latter may be similar to delay circuit 46 and the delay introduced by circuit 50 is also controlled by a knob, this one labelled 52. The output pulse of delay circuit 50 is applied to gate circuit 42.

Figure 4:
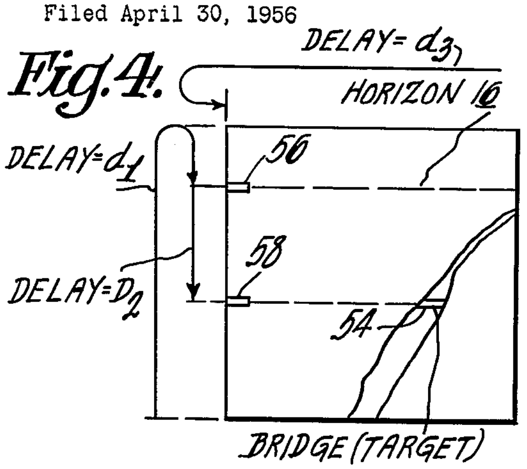
FIGURE 4 is a drawing of a television display as seen in the display device in the circuit of FIGURE 2.

The operation of the system may be followed by reference to FIGURES 2, 3 and 4. The delayed horizontal synchronization pulses are shown in FIGURE 3 at *e*. The delayed vertical synchronization pulses are shown at *f* and *g*, respectively. The delayed vertical synchronization pulses, that is, the pulse output of delay circuits 46 and 50, respectively, are each slightly smaller than the period between a pair of horizontal synchronization pulses. It will be remembered that gate circuits 40 and 42 may comprise tetrodes. In such case, the delayed horizontal synchronization pulses are applied to one grid of the tetrodes and the two delayed vertical synchronization pulses are applied to the other grid of the two tetrodes, respectively. The delayed vertical synchronization pulses are in coincidence with selected ones of the delayed horizontal synchronization pulses and the latter appear as intense marks at the left edge of the television display.

The received television picture is illustrated in FIGURE 4. The horizon 16 is shown at the upper part of the picture. A target such as bridge 54 is shown at the right center of the picture. Delay knob 48 is so adjusted that a first intense mark 56 appears at the left edge of the screen aligned with the horizon. Delay knob 52 is so adjusted that a second intense mark 58 appears aligned with the target. The scale adjacent to knob 52 may be so calibrated that its reading is a measure of the depression angle of the target relative to the horizon. Alternatively, voltages could be derived from the delay circuits, for example, the bias voltages which determine the delay introduced by the delay circuits, which would be indicative of the depression angle. If desired, these could be applied to a computer for deriving precise target location information.

Figure 5:
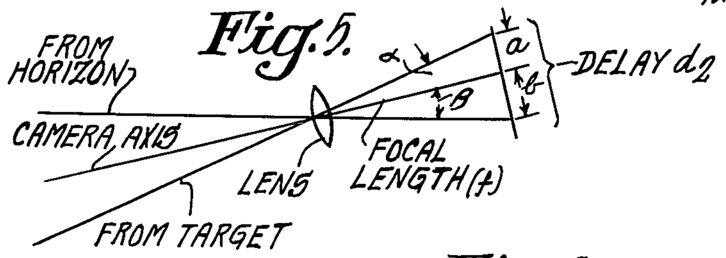
FIGURE 5 is a sketch to explain certain of the limitations of the circuit of FIGURE 2.

Referring to FIGURE 5, it can be seen that the distance measured on the kinescope screen $(a+b)$ is equal to $f$ $(\tan \alpha+\tan \beta)$, where $f$ is the focal length of the lens. When angles $\alpha$ and $\beta$ are relatively small, their tangents are approximately equal to the angles themselves, in radians $(a+b)=f(\alpha+\beta)$. Unfortunately, targets at small angles from the horizon may be of little interest as they may be too far away to be definitely identified. When the targets are closer, their angles from the horizon, as related to the aircraft, are relatively large. It follows that means for measuring relatively large angles are desirable in a system of the type described herein.

Figure 6:
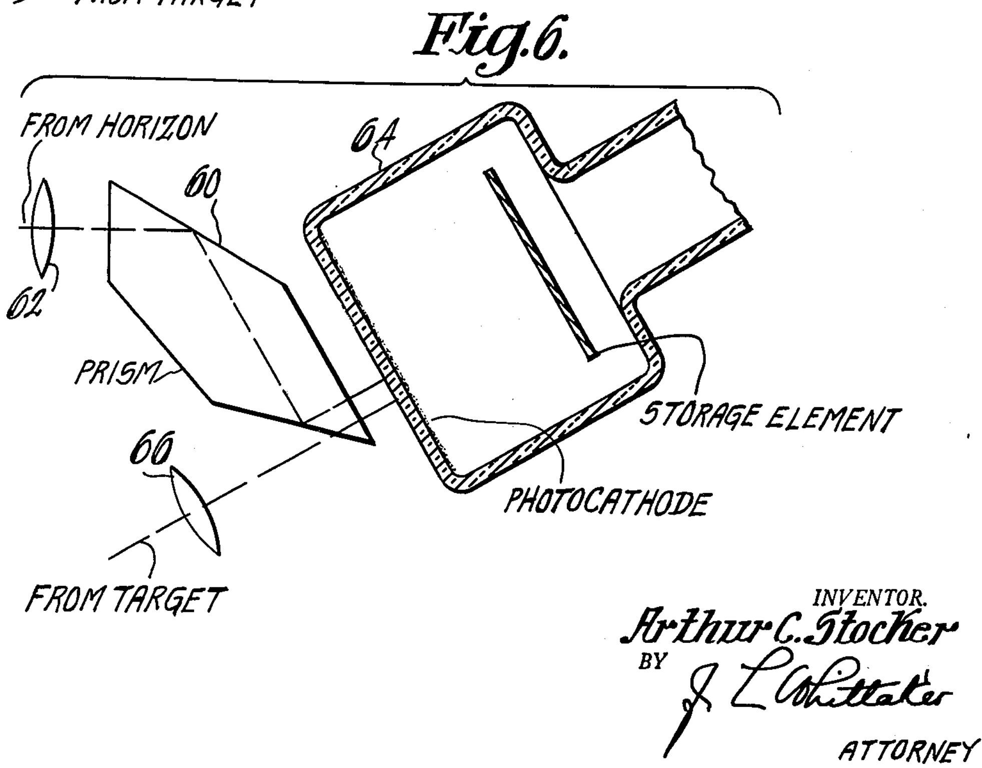
FIGURE 6 is a drawing of a portion of a modified system which is useful for measuring relatively large angles.

FIGURE 6 illustrates a portion of a system which is useful for measuring such large angles. It includes a prism 60 which is designed to bend light from lens 62 through a relatively large angle such as 50°. A prism of this type is described on page 161 of the volume "Fundamentals of Optical Engineering" by Donald H. Jacobs, McGraw Hill, 1943. This prism is cut thin in the direction shown as perpendicular to the paper, and it is so placed relative to the photo cathode 64 of the television camera that it throws light on only one edge of the photo cathode. The remainder of the photo cathode is illuminated by light which passes through lens 66 but not prism 60.

Figure 7:
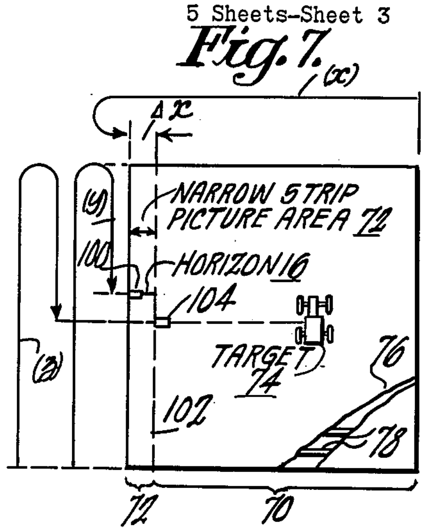
FIGURE 7 is a view of the screen of the display device of a system incorporating the arrangement of FIGURE 6.

The picture which is obtained with the arrangement of FIGURE 6 is as shown in FIGURE 7. The greater part of the picture 70 is the normal television display and is uneffected by the prism 60. The narrow strip 72 at the left edge of the picture displays the image which passes through the prism. The horizon 16 which would, in the absence of the prism, not appear in the picture at all, now appears close to the center portion of strip 72. (Notice that the horizon line 16 does not appear in the main part of the picture 70.) A target 74, shown as a truck, appears in the center of the main part of the screen and a stream 76 with bridges 78 appears at the lower right of the screen.

Figure 8:
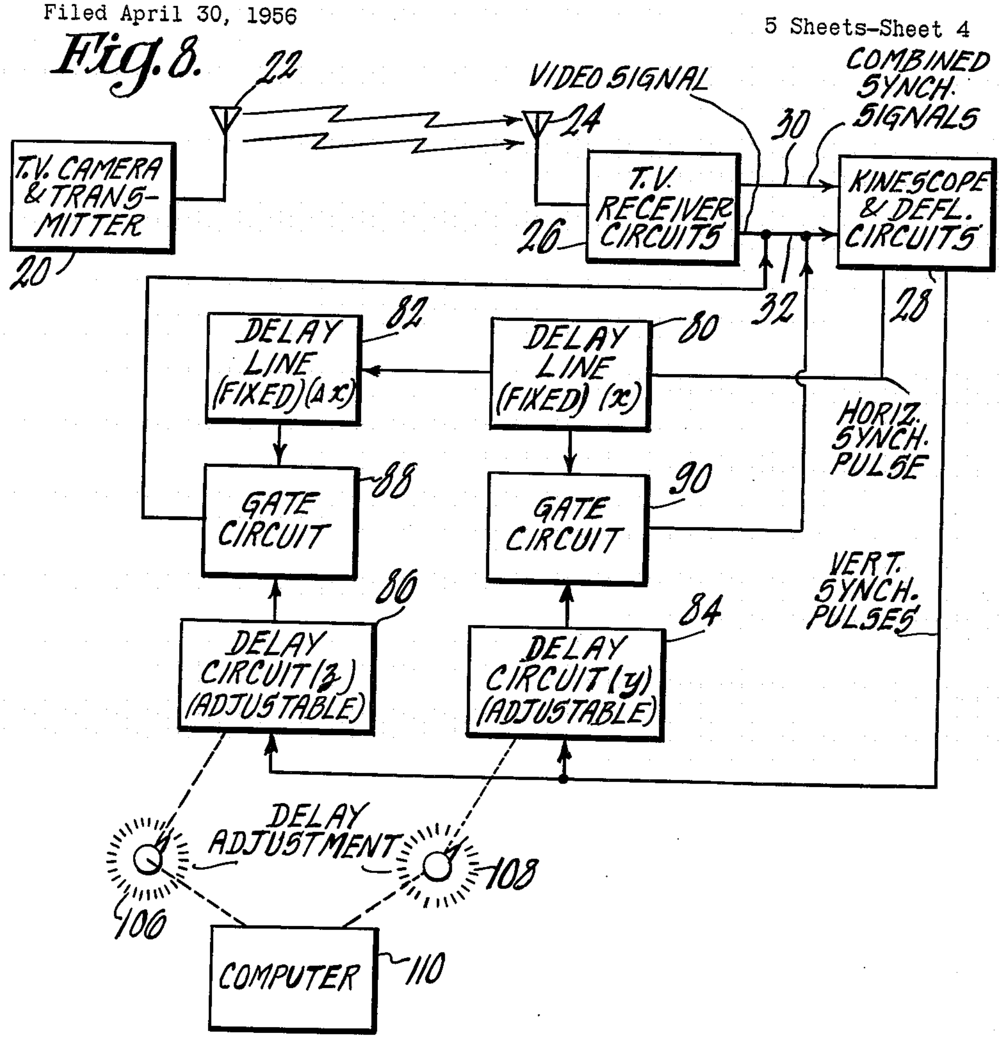
FIGURE 8 is a block circuit diagram of a modified form of the present invention, this one employing the arrangement of FIGURE 6.

In a system which incorporates the arrangement shown in FIGURE 6, the horizon line 16 (FIGURE 7) may appear higher or lower than a target of interest. Therefore, a somewhat different marker arrangement than the one shown in FIGURE 1 is required. One which is suitable for this system is shown in FIGURE 8. Blocks 20, 26 and 28 are analogous to numbered components of FIGURE 2. The horizontal synchronization pulses are delayed a first amount $x$ by delay means 80 and a second amount $\Delta x$ by delay means 82. These may be delay lines. The vertical synchronization pulses are delayed an amount $y$ by adjustable delay circuit 84 and an amount $z$ by adjustable delay circuit 86. The outputs of circuits 82 and 86 are applied to gate circuit 88 and the outputs of circuits 80 and 84 are applied to gate circuit 90. As in the case of the system of FIGURE 1, the gate circuits may be tetrodes, and the adjustable delay circuits phantastrons. The gate circuit outputs are applied to the video signal lead 32 at the input to the kinescope.

The picture which would be obtained with the system of FIGURE 8 is shown in FIGURE 7. The horizontal synchronization pulses delayed $x$ interval of time appear, when in coincidence with a vertical synchronization pulse delayed an interval $y$, at the extreme left edge of the kinescope screen. One such pulse 100 is shown aligned with horizon 16. A horizontal synchronization pulse delayed an amount $x+\Delta x$ appears aligned with the edge of the major portion of the picture (indicated by dashed line 102) when it is in time coincidence with a vertical synchronization pulse delayed an amount $z$. One such intense mark is shown at 104.

As indicated in FIGURE 8, the knobs 106 and 108, which are the delay adjustments for circuits 86 and 84, may be mechanically coupled to a computer 110. The latter provides output information as to the angle between the horizon and target 74. It takes into account the fixed angle reduction imparted by the prism 60. Thus, if the difference in delay, $y-z$, is equivalent to say $+3°$, and the fixed angle reduction is $+50°$, the computer output would be the number 53°, or a voltage indicative of this angle.

Figure 9:
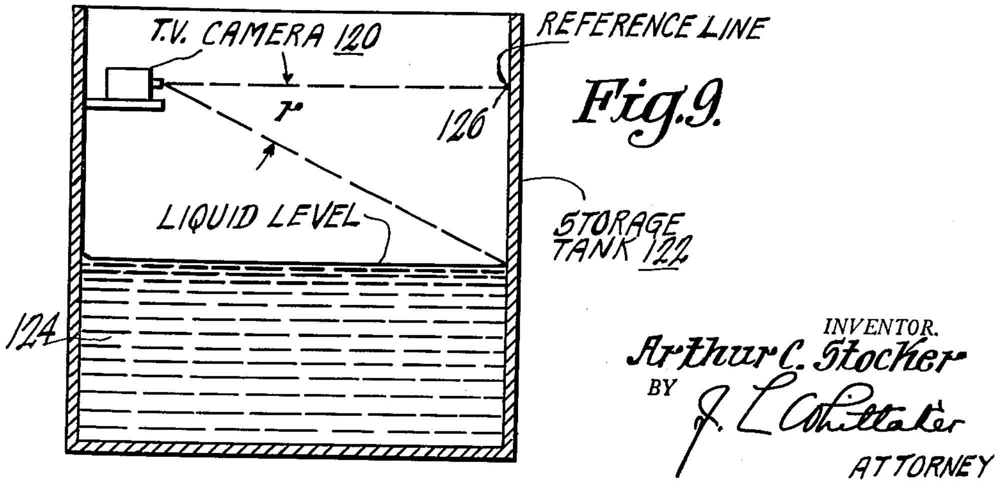
FIGURES 9–14 are sketches of industrial applications of the invention.

One industrial use of the invention is shown in FIGURE 9. The television camera 120 is mounted within a storage tank 122 containing a liquid 124. The latter may be a molten metal, a liquid which gives off noxious fumes, one which is radioactive or any other liquid. The storage tank may be remotely located such as below ground or possibly in a high tower, and may be inaccessible. The liquid level could be determined by measuring the angle $\gamma$ between a reference line 126 and the liquid level as seen in the television picture. The means for measuring the angle have already been described. If the angle $\gamma$ is small, the system of FIGURE 1 may be employed, and if large, the one of FIGURES 6 and 8 may be employed.

Figure 10:
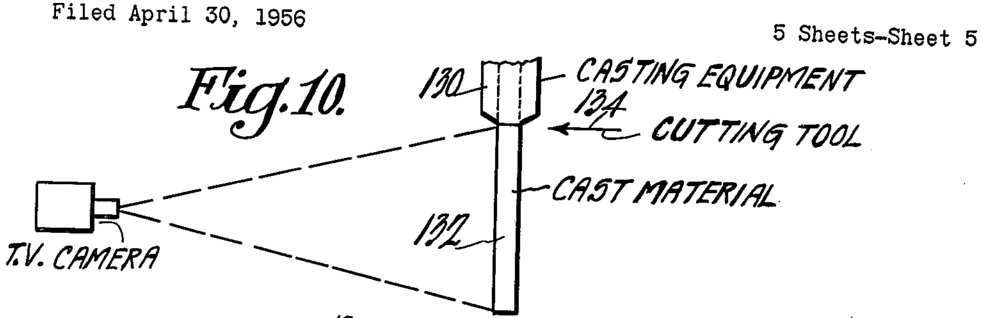

Another use of this invention is for measuring the length of material produced by a continuous casting mill to determine when the material is to be sawed off. This use is illustrated in FIGURE 10. The extrusion end of the equipment is shown at 130, the cast material at 132 and the cutting tool is shown as an arrow 134.

Figures 11, 12, 13, 14:
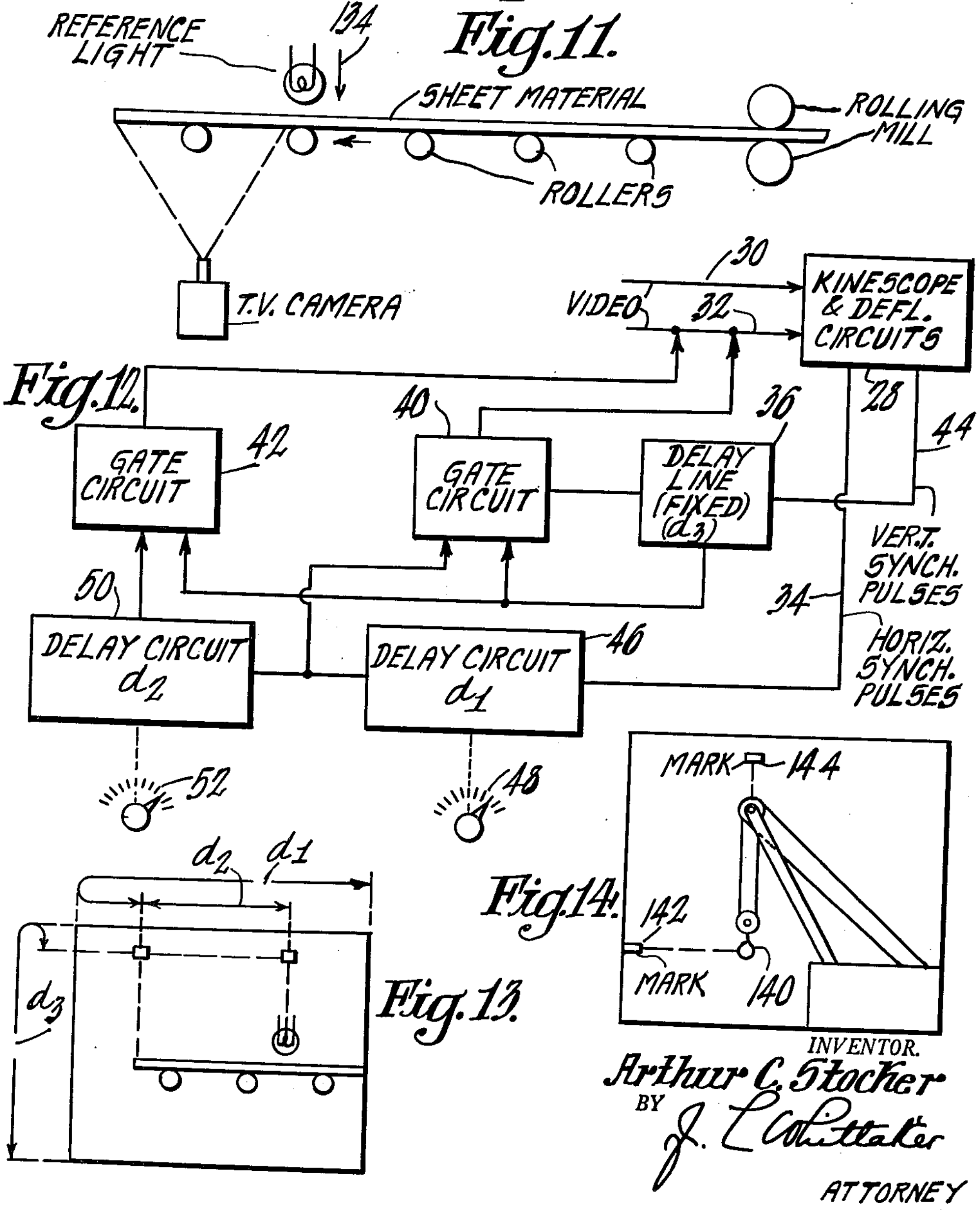

Still another use of the invention is a rolling mill to indicate the length of rolled material. This is illustrated in FIGURE 11, the figure being self-explanatory. The cutting tool is also designated by an arrow 134. The television circuits may be exactly like the ones shown in FIGURE 1 or FIGURE 7. However, since the strip is horizontal, it is necessary to turn the camera on its side. Alternatively, the circuit shown in FIGURE 12 may be employed instead. It is believed that the mode of operation of this circuit is self-evident. In brief, the vertical synchronization pulses are delayed a fixed amount $d_3$ so that they appear at the top edge of the screen when intensified. The horizontal synchronization pulses are delayed a first adjustable amount $d_1$ by delay circuit 36 and a second adjustable amount $d_2$ by delay circuit 50. The resultant picture, as viewed on the television receiver screen, is as shown in FIGURE 13.

Where the angle to be measured is large, a prism such as shown in FIGURE 6 may be employed in a circuit similar to the one shown in FIGURE 8. It is necessary, however, to reverse the horizontal and vertical synchronization pulse leads to obtain the intense marks side-by-side (similarly to the circuit of FIGURE 12).

The circuits of FIGURES 1 and 12 may be combined to measure angles about two perpendicular axes. FIGURE 14 illustrates, for example, how to locate a crane load of highly dangerous radioactive material 140, as in replacing the fuel in an atomic reactor. Mark 142 is an intensified, delayed, horizontal synchronization pulse and it may be obtained with the circuit of FIGURE 1. Mark 144 is an intensified delayed vertical synchronization pulse and it may be obtained with the circuit of FIGURE 12.

What is claimed is:

1. A television system comprising, in combination, a television camera; a television transmitter coupled to the camera for transmitting signals indicative of a scene viewed by the camera; a television receiver for receiving said signals including display means for displaying the same; means for generating pulses; means including adjustable delay means coupled to said last-named means for producing two spaced pulses, one occurring in time coincidence with one area on said display means and the other in time coincidence with another area on said display means and for applying said pulses to said display means; and means coupled to said adjustable delay means for indicating the delay interval between said two spaced pulses.

2. In combination, a television receiver including receiver circuits for receiving horizontal and vertical synchronization signals and picture signals, and a display means receptive of all of said signal for displaying the received picture; delay means for delaying one type of said synchronization signals an amount sufficient to permit them to appear on said display means; first means for delaying the other type of said synchronization signals an adjustable amount; second means for delaying the other type of synchronization signals an adjustable amount; means coupled to said first means and to said one type of synchronization signal delay means for placing a mark on said screen aligned with the image of an object on said screen; and means coupled to said second means and to said one type of signal delay means for placing a mark on said display means aligned with the image of another object on said screen.

3. In combination, a television receiver including receiver circuits for receiving horizontal and vertical synchronization signals and picture signals, and a display means receptive of all of said signal for displaying the received picture; delay means for delaying one type of said synchronization signals an amount sufficient to permit them to appear on said display means; first means for delaying the other type of said synchronization signals an adjustable amount; second means for delaying the other type of synchronization signals an adjustable amount; means coupled to said first means and to said one type of synchronization signal delay means for placing a mark on said screen aligned with the image of an object on said screen; means coupled to said second means and to said one type of signal delay means for placing a mark on said display means aligned with the image of another object on said screen; and means for measuring the delay introduced by said second delay means.

4. In combination, a television receiver including receiver circuits for receiving horizontal and vertical synchronization signals and picture signals, and a display means receptive of all of said signals for displaying the received picture; delay means for delaying said horizontal synchronization signals an amount sufficient to permit them to appear on said display means; first means for delaying said vertical synchronization signals an adjustable amount; second means for delaying said vertical synchronization signals an adjustable amount; means coupled to said first means and to said horizontal synchronization signal delay means for placing a mark on said screen aligned with the image of an object on said screen; and means coupled to said second means and to said horizontal synchronization signal delay means for placing a mark on said display means aligned with the image of another object on said screen.

References Cited in the file of this patent

UNITED STATES PATENTS

| | | |
|---|---|---|
| 2,416,088 | Deerhake | Feb. 18, 1947 |
| 2,528,202 | Wolff | Oct. 31, 1950 |
| 2,595,358 | Herbst | May 6, 1952 |
| 2,632,157 | Jones | Mar. 7, 1953 |
| 2,637,022 | De France | Apr. 28, 1953 |
| 2,644,156 | Schneider | June 30, 1953 |
| 2,757,236 | Bedford | July 31, 1956 |
| 2,774,964 | Baker et al. | Dec. 18, 1956 |
| 2,786,096 | Palmer | Mar. 19, 1957 |